United States Patent [19]

Robeson

[11] Patent Number: 4,684,699

[45] Date of Patent: Aug. 4, 1987

[54] ALLOYS OF A POLY(ARYLENE SULFIDE) AND A POLY(ARYL KETONE)

[75] Inventor: Lloyd M. Robeson, Whitehouse Station, N.J.

[73] Assignee: Amoco Corporation, Chicago, Ill.

[21] Appl. No.: 492,123

[22] Filed: May 6, 1983

Related U.S. Application Data

[63] Continuation of Ser. No. 249,006, Mar. 30, 1981, abandoned.

[51] Int. Cl.$^4$ ................... C08L 61/02; C08L 81/04
[52] U.S. Cl. ........................... 525/471; 525/534; 525/537
[58] Field of Search ............ 525/390, 537, 534, 471

[56] References Cited

U.S. PATENT DOCUMENTS

| | | | |
|---|---|---|---|
| 3,634,355 | 1/1972 | Barr et al. | 525/390 |
| 4,021,596 | 5/1977 | Bailey | 525/390 |
| 4,046,836 | 9/1977 | Adelmann et al. | 525/537 |
| 4,421,588 | 12/1983 | Davies | 525/537 |

Primary Examiner—Wilbert J. Briggs, Sr.
Attorney, Agent, or Firm—Donald Mark Papuga; William H. Magidson; Ralph C. Medhurst

[57] ABSTRACT

Described herein are alloys comprising a poly(arylene sulfide) and a poly(aryl ketone). These alloys have a good combination of mechanical properties and unexpectedly display a higher strength than would be expected from the weight averaged constituent values.

12 Claims, 1 Drawing Figure

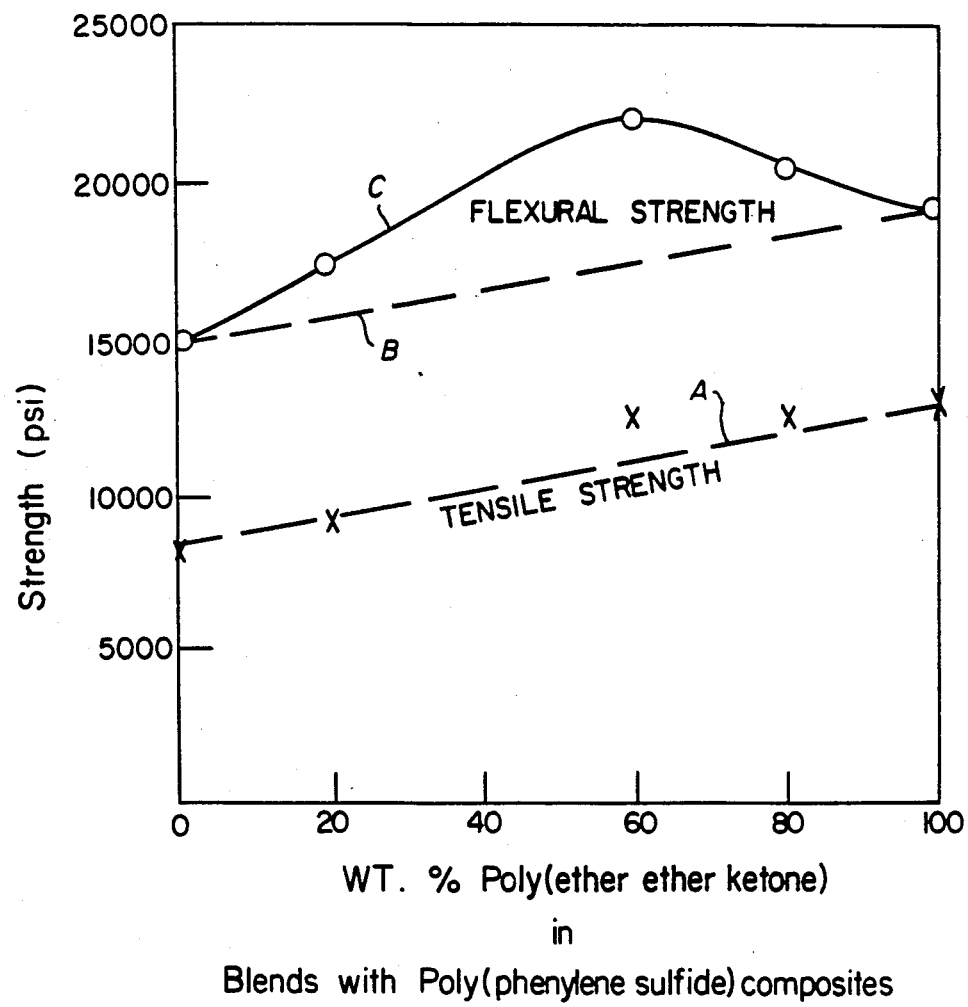
Blends with Poly(phenylene sulfide) composites

ALLOYS OF A POLY(ARYLENE SULFIDE) AND A POLY(ARYL KETONE)

This application is a continuation of our prior U.S. application Ser. No. 249,006 filing date 3/30/81, now abandoned.

This invention is directed to an alloy comprising a poly(arylene sulfide) and a poly(aryl ketone).

Poly(aryl ketone)s are a relatively new class of engineering polymers. Several poly(aryl ketone)s are crystalline and exhibit an excellent combination of properties, i.e., excellent thermal and hydrolytic stability, high strength and toughness, excellent wear and abrasion resistance and excellent solvent resistance. Thus articles molded from poly(aryl ketone)s have utility where high performance is required. Two of these crystalline poly(aryl ketones) are commercially available and are of the following structure:

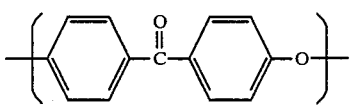
(I)

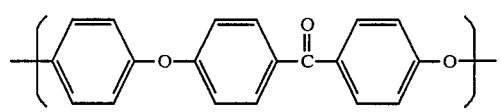
(II)

To achieve the desired combination of properties, high molecular weight poly(aryl ketone)s are necessary. These high molecular weight poly(aryl ketone)s have a narrow processing latitude and require very high processing temperatures (about 400° C.) during molding.

Many materials which could act as a plasticizer or processing aid for the poly(aryl ketone)s are not stable at such a high processing temperature. Also, most polymers do not have adequate thermal stability at such processing temperatures to allow them to be blended with the poly(aryl ketone).

Thus, there is a desire to improve the processing of poly(aryl ketone)s, particularly in the presence of fibers and fillers which decrease the processing range.

It has been found that the addition of a poly(arylene sulfide) to a poly(aryl ketone) results in improved processing of the poly(aryl ketone) in that it can be processed at lower temperatures. Additionally, the alloy of poly(arylene sulfide) and poly(aryl ketone) has an excellent balance of properties and unexpectedly higher strength than would be expected from the weight averaged constituent values.

THE INVENTION

This invention is directed to an alloy comprising a poly(arylene sulfide) and a poly(aryl ketone).

The Drawing shows a plot of tensile and flexural strengths versus the amount of poly(aryl ketone) of formula II above referred to as poly(ether ether ketone) in the alloy. Line A represents the calculated tensile strength of the materials in the alloy and represents mechanical compatibility. The notation x represents the actual tensile strength values measured on the alloy. The tensile strength values determined show that the poly(ether ether ketone) and poly(phenylene sulfide) are mechanically compatible. Line B represents the calculated flexural strength of the materials in the alloy and represents mechanical compatability. Line C represents that the flexural strength of the alloy is much higher than would be expected from the flexural strength values of the constituents in the alloy.

The poly(arylene sulfide)s which are suitable for use herein are solid, have a melting point of at least about 150° F. and are insoluble in common solvents. Such resins can be conveniently prepared by the process disclosed in, for example, U.S. Pat. No. 3,354,129. Briefly, the process comprises the reaction of an alkali metal sulfide and a polyhalo ring-substituted aromatic compound in the presence of a suitable polar organic compound, as for example, the reaction of sodium sulfide with dichlorobenzene in the presence of N-methyl-2-pyrrolidone to form poly(phenylene sulfide).

The resulting polymer contains the aromatic nucleus of the polyhalo-substituted monomer coupled in repeating units predominantly through a sulfur atom. The polymers which are preferred for use according to this invention are those polymers having the repeating unit —R—S— where R is phenylene, biphenylene, naphthylene, or a lower alkyl-substituted derivative thereof. By "lower alkyl" is meant alkyl groups having one to six carbon atoms such as methyl, propyl, isobutyl, n-hexyl and the like.

The preferred poly(arylene sulfide) is poly(phenylene sulfide), a crystalline polymer with a repeating structural unit comprising a para-substituted benzene ring and a sulfur atom which may be described by the following formula, where n has a value of at least about 50.

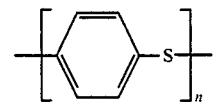

Suitable poly(phenylene sulfide) compositions are available commercially under the trade name RYTON of the Phillips Petroleum Company, and include compositions which are either unfilled, or filled with fiberglass or some such conventional material. Preferably, the poly(phenylene sulfide) component has a melt flow index, measured at 600° F., using a 5 Kg. weight and a standard orifice, within the range of from about 10 to about 7000.

The term poly(arylene sulfide) is meant to include not only homopolymers but also normally solid arylene sulfide copolymers, terpolymers and the like.

The poly(aryl ketone)s which are suitable for use herein contain repeating units of the following formula:

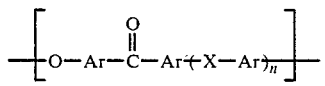

wherein Ar is independently a divalent aromatic radical selected from phenylene, biphenylene or naphthylene, X is independently O,

or a direct bond, and n is an integer of from 0 to 3.

Preferably, the poly(aryl ketone) contains repeating units of the following formula:

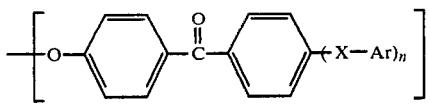

wherein Ar, X, and n are as previously defined.

The most preferred poly(aryl ketone)s have repeating units of the formula:

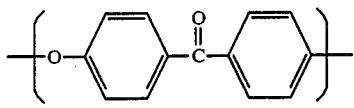 (I)

or

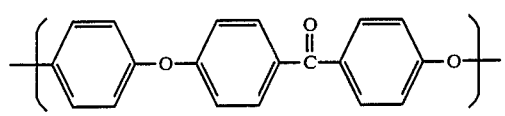 (II)

These poly(aryl ketone)s are prepared by methods well known in the art, such as by heating a substantially equimolar mixture of at least one bisphenol and at least one dihalobenzoid compound or at least one halophenol compound. Preferred bisphenols include:

hydroquinone,
4,4'-dihydroxybenzophenone,
4,4'-dihydroxybiphenyl, and
2,2'-bis(4-hydroxyphenyl)propane.

Preferred dihalo and dihalobenzoid compounds include:

4-(4-chlorobenzoyl)phenol,
4,4'-difluorobenzophenone,
4,4'-dichlorobenzophenone, and
4-chloro-4'-fluorobenzophenone.

The poly(aryl ketone)s may be produced by the process as described in U.S. Pat. No. 4,176,222. This process comprises heating in the temperature range of 100° to 400° C., (i) a substantially equimolar mixture of (a) at least one bisphenol and (b) at least one dihalobenzoid compound, or (ii) at least one halophenol, in which in the dihalobenzoid compound or halophenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

Poly(aryl ketone)s containing repeating units of the following formula:

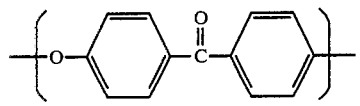

may also be prepared by methods described in U.S. Pat. No. 3,953,400. This process comprises polymerizing monomers reactive under Friedel-Crafts acylating conditions in the presence of an aromatic capping agent whose rate of acylation relative to benzene is greater than 150. The polymerization is generally catalyzed by boron trifluoride.

The term poly(aryl ketone) is meant to include homopolymers, copolymers, terpolymers, and the like.

The poly(aryl ketone)s have a reduced viscosity of at least about 0.6 to about 3.0, as measured in concentrated sulphuric acid at 25° C.

The alloys of this invention are prepared by conventional methods as by mixing a dry powder or pellet in a blender, etc. followed by further mixing in an extruder, or other suitable compounding device, under conditions such that the resins employed will melt.

The poly(arylene sulfide) and poly(aryl ketone) are combined in amounts of from about 2 to about 98, preferably from about 10 to about 90 weight percent.

The blends of poly(arylene sulfide) and poly(aryl ketone) with added filler or fiberglass, or both, are of particular interest herein. Inorganic fillers such as talc, wollastonite, mica, calcium carbonate, clay, silica, glass spheres, and the like are suitable for use in the blend.

The alloys may contain conventional additives such as fibers, dyes, pigments, flame retardant additives, thermal stabilizers, ultraviolet light stabilizers, and the like.

The additives may be added to the individual resins before formation or during formation of the alloy, or after formation of the alloy upon a subsequent melting of the alloy. The alloys may also contain at least one thermoplastic polymer, such as an aromatic polysulfone, an aromatic polycarbonate or an aromatic polyhydroxyether.

EXAMPLES

The following examples serve to give specific illustrations of the practice of this invention but they are not intended in any way to limit the scope of this invention.

EXAMPLE 1

80 weight percent of a poly(ether ether ketone) of the following formula:

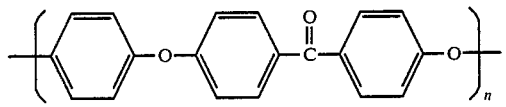

having a reduced viscosity of 1.2 as measured in a 96 percent sulfuric acid solution (one percent polymer solution) at 25° C. was blended with 20 weight percent of a poly(phenylene sulfide) (Ryton R-10 supplied by Phillips Petroleum Company) in a 1¼ ounce Newbury screw injection molding machine at 650°–670° F. Pellets of the two resins were used. The poly(phenylene sulfide) contains both mineral filler and fiberglass as supplied. The resins were injected molded into ASTM test bars and tested for the following properties: tensile modulus and tensile strength according to ASTM D-638; percent elongation according to ASTM-D-638; tensile impact strength according to ASTM D-1822; notched izod impact strength according to ASTM D-256; heat distortion temperature according to ASTM D-635 (264 psi; ⅛ inch bar); flexural strength and flexural modulus according to ASTM D-790. The results are shown in Table I.

Table I also shows the molding conditions in preparing the alloy.

EXAMPLE 2

60 weight percent of the poly(ether ether ketone) described in Example 1 was blended with 40 weight percent of the poly(phenylene sulfide) described in Example 1 by the procedure as described in Example 1.

The resins were molded into test bars and tested by the procedures as described in Example 1.

The results are shown in Table I.

EXAMPLE 3

20 weight percent of the poly(ether ether ketone) described in Example 1 was blended with 80 weight percent of the poly(phenylene sulfide) described in Example 1 by the procedure as described in Example 1.

The resins were molded into test bars and tested by the procedures as described in Example 1.

The results are shown in Table I.

In Table I, Control A is the poly(ether ether ketone), i.e., PEEK and Control B is the poly(phenylene sulfide), i.e., PPS.

It is of interest to note that lower temperature and/or injection pressures were achieved with addition of the highly filled poly(phenylene sulfide) (fiber and filler content 50 weight percent) to the poly(ether ether ketone). Without the fiber and mineral filler, a much greater degree of plasticization and thus lowering of molding conditions would be expected. Likewise, if fiberglass and filler were added to the poly(ether ether ketone) without simultaneously adding the poly(phenylene sulfide), the molding temperatures and/or pressures would have been more severe.

It is unexpected that the blend compositions would exhibit higher flexural strengths than either of the unblended constituents. This synergistic behavior clearly illustrates the mechanical compatibility of this blend.

TABLE I

| Example | Control A | Control B | Example 1 | Example 2 | Example 3 |
|---|---|---|---|---|---|
| Composition Ingredients (amount) | PEEK (100) | PPS (100) (composite) | PEEK (80) PPS (20) | PEEK (60) PPS (40) | PEEK (20) PPS (80) |
| Properties | | | | | |
| Tensile Modulus (psi) | 531,000 | 4,310,000 | 687,000 | 926,000 | 2,530,000 |
| Tensile Strength (psi) | 12,900 | 8,440 | 12,500 | 12,500 | 9,120 |
| Elongation (%) | 98 | 0.28 | 16.7 | 2.5 | 0.43 |
| Tensile Impact Strength (ft-lbs/in.$^2$) | 123 | 5 | 38 | 12 | 6 |
| Notched Izod Impact Strength (ft-lbs/in. of notch) | 1.7 | 0.48 | 1.4 | 1.0 | 0.83 |
| Heat Distortion Temperature, °C. | 143 | 254 | 147 | 159 | 247 |
| Flexural Modulus (psi) | 494,000 | 2,740,000 | 641,000 | 968,000 | 1,920,000 |
| Flexural Strength (psi) | 19,200 | 14,900 | 20,400 | 21,900 | 17,300 |
| Molding Conditions Temperature | | | | | |
| Rear, °F. | 680 | 570 | 670 | 670 | 650 |
| Mid, °F. | 670 | 560 | 660 | 660 | 640 |
| Nozzle, °F. | 660 | 560 | 650 | 650 | 630 |
| Mold Temperature, °C. | 130 | 150 | 140 | 140 | 140 |
| Revolutions per minute | 80 | 140 | 100 | 130 | 130 |
| Injection Pressure, psi | 950 | 650 | 1000 | 900 | 650 |
| Cycle Time, sec | 52 | 52 | 52 | 52 | 52 |

EXAMPLE 4

75 weight percent of the poly(ether ether ketone) described in Example 1 was blended with 25 weight percent of the poly(phenylene sulfide) described in Example 1. The resins were blended in a Brabender mixer at 360° C. The blend was then compression molded at 360° C. The secant modulus at various temperatures was described as shown in Table II. Also the modulus ratio of the blend to poly(ether ether ketone) is shown in Table II.

Control A is the poly(ether ether ketone).

TABLE II

| Example | Control A | Example 1 | Modulus Ratio of Example 1: Control A |
|---|---|---|---|
| Composition Ingredients (amounts) | PEEK (100) | PEEK[1] (75) PPS (25) | |
| Temperature °C. | Scant Modulus (%) | | |
| 100 | 310,000 | 370,000 | 1.19 |
| 150 | 145,000 | 165,000 | 1.14 |
| 175 | 54,000 | 90,000 | 1.67 |
| 200 | 44,000 | 68,000 | 1.55 |
| 250 | 26,000 | 43,000 | 1.65 |
| 300 | 12,500 | 19,000 | 1.52 |

[1]PEEK = poly(ether ether ketone)
PPS = poly(phenylene sulfide) composite

The date in the Table shows that the addition of the filled poly(phenylene sulfide) improves the stiffness of poly(ether ether ketone), particularly at elevated temperatures, i.e., greater than 150° C.

EXAMPLE 5

30 weight percent of the poly(ether ether ketone) described in Example 1, 30 weight percent of the poly(phenylene sulfide) described in Example 1, and 40 weight percent of polysulfone (P-1700 supplied by Union Carbide Corporation) having a reduced viscosity of 0.48 as measured in chloroform at 25° C. (0.2 g/dl), were blended by mixing pellets of each of the resins and injection molding the pellet mixture into ASTM test bars in an injection molding machine as described in Example 1. The test bars were tested for the properties as described in Example 1. The results are as follows:

| | |
|---|---|
| Tensile modulus (psi) | 628,000 |
| Tensile strength (psi) | 11,200 |
| Elongation (%) | 10 |
| Tensile Impact Strength (ft-lbs/in$^2$) | |
| Notched Izod Impact Strength (ft-lbs/in of notch) | 1.2 |
| Flexural modulus (psi) | 700,000 |
| Flexural strength (psi) | 19,550 |
| Calculated Tensile Strength (psi) | 10,400 |
| Calculated Flexural Strength (psi) | 16,400 |

As both the actual tensile and flexural strength of the blend are higher than the calculated weight averaged constituent values, this ternary blend exhibits better strength than that expected even for a mechanically compatable system.

What is claimed is:

1. An alloy comprising from about 2 to about 98 weight percent of a poly(arylene sulfide) and from about 98 to about 2 weight percent of a crystalline poly(aryl ether ketone).

2. An alloy as described in claim 1 wherein the poly(arylene sulfide) is poly(phenylene sulfide).

3. An alloy as described in claims 2 wherein the poly(phenylene sulfide) contains a filler and/or fiber.

4. An alloy as defined in claim 1 wherein the poly(aryl ketone) has repeating units of the formula:

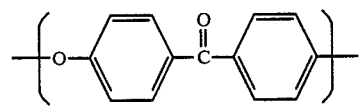

5. An alloy as defined in claim 1 wherein the poly(aryl ketone) has repeating units of the formula:

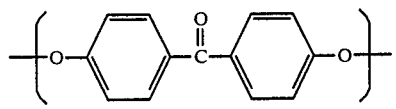

6. An alloy as defined in claim 1 wherein the alloy contains at least one thermoplastic polymer.

7. An alloy as defined in claim 6 wherein the thermoplastic polymer is an aromatiuc polysulfone, an aromatic polycarbonate or an aromatic polyhydroxyether.

8. An alloy as described in claim 2 wherein the poly(arylene sulfide) is of the following formula:

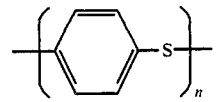

wherein n is at least about 50.

9. An alloy as defined in claim 1 wherein the poly(aryl ketone) is of the following formula:

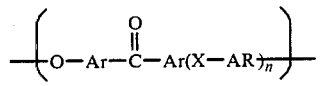

wherein Ar is independently a divalent aromatic radical selected from phenylene, biphenylene or naphthylene, X is independently O,

or a direct bond, and n is an integer of from 0 to 3.

10. An alloy as defined in claim 1 wherein the poly(aryl ketone) is of the following formula:

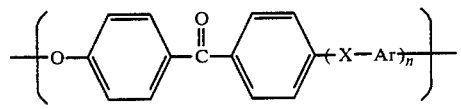

wherein Ar is independently a divalent aromatic radical selected from phenylene, biphenylene, or naphthylene, X is independently O,

or a direct bond, and n is an integer of from 0 to 3.

11. An alloy as defined in claim 1 wherein the poly(arylene sulfide) and poly(aryl ketone) are combined in amounts of from about 10 to about 90 weight percent.

12. A method for fabricating an article from the alloy of claim 1 which comprises heating the alloy to produce the fabricated article.

* * * * *